United States Patent
George et al.

(10) Patent No.: US 7,962,643 B2
(45) Date of Patent: Jun. 14, 2011

(54) METHOD AND APPARATUS FOR REDUCING SPAM ON PEER-TO-PEER NETWORKS

(75) Inventors: David A. George, Somers, NY (US); Raymond B. Jennings, III, Ossining, NY (US); Jason D. LaVoie, Mahopac, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/163,439

(22) Filed: Jun. 27, 2008

(65) Prior Publication Data
US 2008/0263202 A1 Oct. 23, 2008

Related U.S. Application Data

(63) Continuation of application No. 11/152,890, filed on Jun. 15, 2005, now Pat. No. 7,552,230.

(51) Int. Cl.
*G06F 15/16* (2006.01)
(52) U.S. Cl. ........ 709/235; 709/206; 709/227; 709/232; 713/154; 713/170; 713/181
(58) Field of Classification Search .......... 709/204–207, 709/227–228, 232–235; 713/153–154, 164–170, 713/181
See application file for complete search history.

(56) References Cited

U.S. PATENT DOCUMENTS

| | | | |
|---|---|---|---|
| 6,360,215 B1 * | 3/2002 | Judd et al. .................. 709/202 |
| 6,654,787 B1 | 11/2003 | Aronson et al. |
| 7,032,030 B1 | 4/2006 | Codignotto |
| 7,181,498 B2 | 2/2007 | Zhu et al. |
| 7,257,564 B2 | 8/2007 | Loughmiller et al. |
| 7,293,065 B2 | 11/2007 | Banister et al. |
| 7,320,020 B2 * | 1/2008 | Chadwick et al. ........... 709/206 |
| 7,389,413 B2 * | 6/2008 | Bandini et al. ............... 713/153 |
| 2002/0194489 A1 | 12/2002 | Almogy et al. |
| 2003/0225841 A1 | 12/2003 | Song et al. |
| 2003/0229672 A1 | 12/2003 | Kohn |
| 2004/0177110 A1 | 9/2004 | Rounthwaite et al. |
| 2005/0076084 A1 | 4/2005 | Loughmiller et al. |
| 2005/0076220 A1 * | 4/2005 | Zhang et al. ................. 713/176 |
| 2005/0086205 A1 | 4/2005 | Franciosa et al. |
| 2005/0120019 A1 | 6/2005 | Rigoutsos et al. |
| 2006/0168042 A1 * | 7/2006 | Boivie et al. ................. 709/206 |
| 2007/0005970 A1 * | 1/2007 | Trupp et al. .................. 713/170 |

OTHER PUBLICATIONS

PCT Search Report and Written Opinion for PCT/US06/23425, May 29, 2008, copy consists of 8 unnumbered pages.
PCT International Preliminary Report on Patentability for PCT/US06/023425, Jun. 26, 2008, copy consists of 5 unnumbered pages.

* cited by examiner

*Primary Examiner* — Bharat N Barot

(57) ABSTRACT

One embodiment of the present method and apparatus for reducing spam in peer-to-peer networks includes forming a search message including at least one decoy word and sending the search request message, including the decoy word(s), to one or more nodes in the network. Embodiments of the present invention make it possible to weed out nodes in the network that send spam in response to every search message (e.g., regardless of the search message's content).

31 Claims, 4 Drawing Sheets

METHOD AND APPARATUS FOR REDUCING SPAM ON PEER-TO-PEER NETWORKS

CROSS REFERENCE TO RELATED APPLICATIONS

This application is a continuation of U.S. patent application Ser. No. 11/152,890, filed Jun. 15, 2005, now U.S. Pat. No. 7,552,230 entitled "METHOD AND APPARATUS FOR REDUCING SPAM ON PEER-TO-PEER NETWORKS", which is herein incorporated by reference in its entirety.

BACKGROUND

The present invention relates generally to computing networks and relates more particularly to the propagation of spam (e.g., unsolicited or spoofed data) over peer-to-peer data transfer networks.

FIG. 1 is a schematic diagram of a network 100 of nodes (e.g., computing devices) interacting in a peer-to-peer (P2P) manner. Generally, a requesting node 101 sends a search message 105 (e.g., containing keywords relating to data that the requesting node 101 wishes to locate) to at least one intermediate node 111 in communication with the requesting node 101 via a peer connection. The intermediate node 111 receives the search message 105 and forwards the search message 105 to at least one additional node 111. Eventually, the search message 105 reaches at least one responding node 103 having the requested data (in some cases, the first intermediate node 111 to which the search message 105 is forwarded will also be a responding node 103). At least one responding node 103 then sends a response message 107 back to the requesting node 101, e.g., via the intermediate nodes 111. The requesting node 101 then requests the relevant data from a responding node 103 by connecting directly to the responding node 103, e.g., via direct connection 109.

In conventional P2P systems, it has become common for some responding nodes 103 to disguise "spam" content (e.g., unsolicited or spoofed data, such as advertisements) inside of transferred files. Some responding nodes may even send spam content in response to substantially any search message that is received, regardless of the keywords included in the search message. For example, in response to a search request message 105 including the search terms "Joe's poetry", a responding node 103 may indicate that it has a file labeled "Joes_poetry.mp3" or "JoesPoetry.wmv". However, instead of containing content related to Joe's poetry, the file in fact contains an advertisement for a product completely unrelated to Joe or poetry. If the user at the requesting node does not immediately check the content of the transferred file, he or she may be unaware that the transferred file contains spam and may unknowingly share the spam content with other users on the P2P network.

Thus, there is a need in the art for a method and apparatus for reducing spam on a P2P network.

SUMMARY OF THE INVENTION

One embodiment of the present method and apparatus for reducing spam in peer-to-peer networks includes forming a search message including at least one decoy word and sending the search request message, including the decoy word(s), to one or more nodes in the network. Embodiments of the present invention make it possible to weed out nodes in the network that send spam in response to every search message (e.g., regardless of the search message's content).

BRIEF DESCRIPTION OF THE DRAWINGS

So that the manner in which the above recited embodiments of the invention are attained and can be understood in detail, a more particular description of the invention, briefly summarized above, may be obtained by reference to the embodiments thereof which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures.

DETAILED DESCRIPTION

In one embodiment, the present invention is a method and apparatus for reducing spam in P2P networks. Embodiments of the present invention make it possible for a user to identify disguised spam sent in response to search messages before downloading the associated data, so that the user does not download and subsequently potentially share the spam with other users. Embodiments of the present invention are especially effective in identifying nodes that send spam in response to substantially any search message that they receive, regardless of the content of the search message.

For the purposes of the present invention, the term "node" refers to a computing device such as a personal computing device (e.g., a desk top computer, a laptop computer, a cellular telephone, a personal digital assistant, etc.), a server, a router or the like that is connected to a P2P network.

Figure 1:
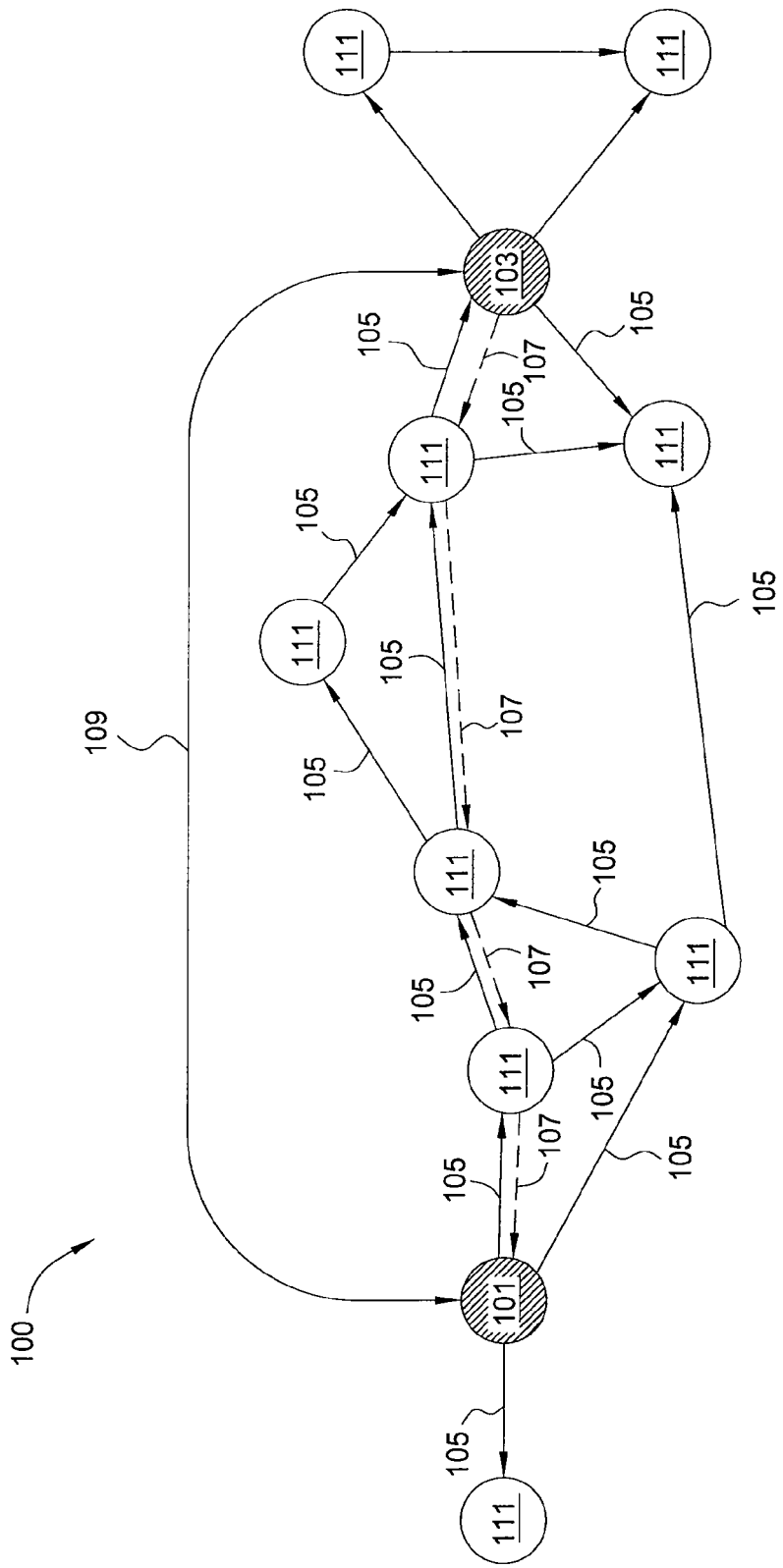
FIG. 1 is a schematic diagram of a network of nodes interacting in a peer-to-peer manner.
Figure 2:
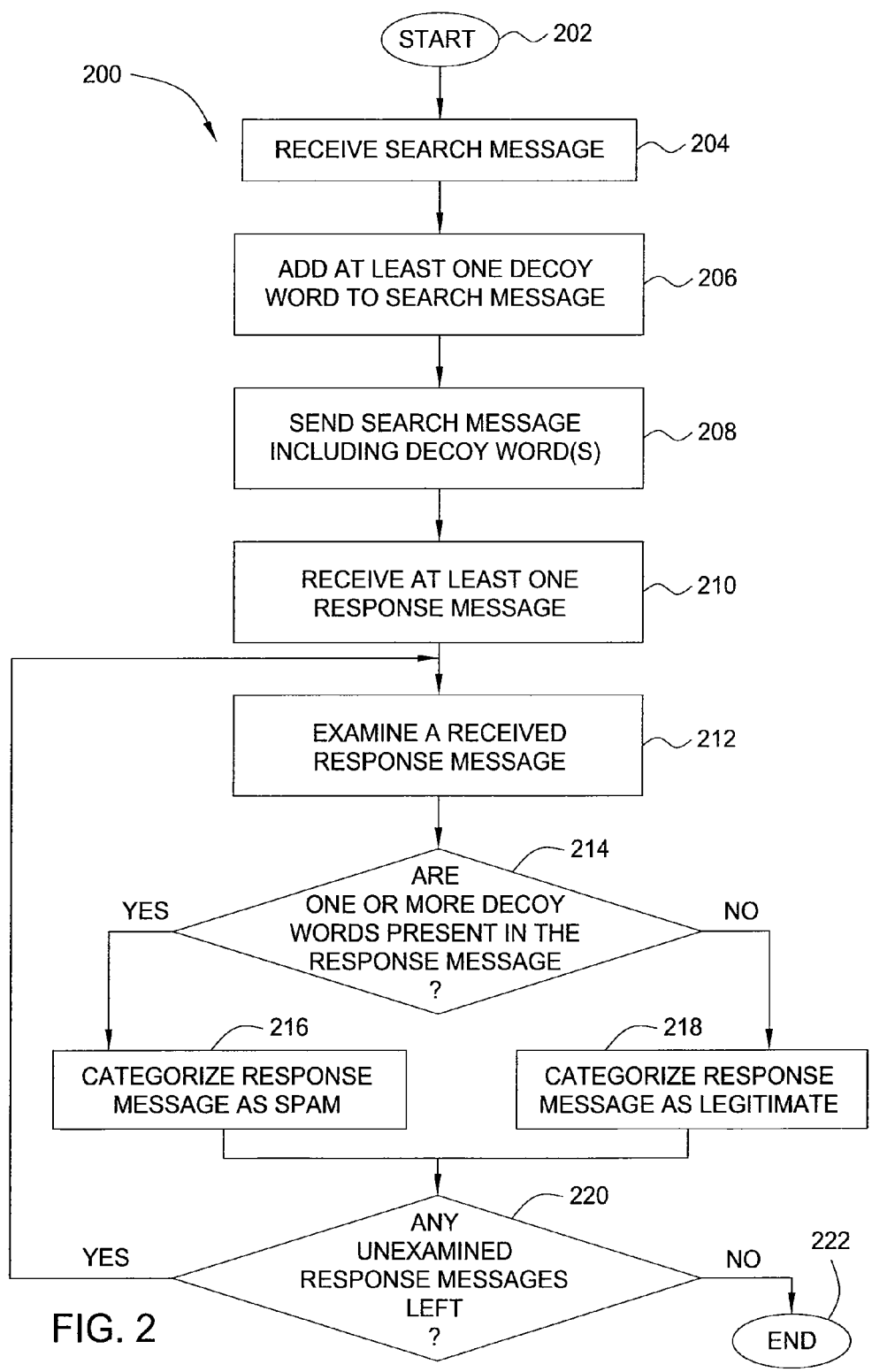
FIG. 2 is a flow diagram illustrating one embodiment of a method for reducing spam on a P2P network, according to the present invention.

FIG. 2 is a flow diagram illustrating one embodiment of a method 200 for reducing spam on a P2P network, according to the present invention. Although the invention is described within the context of a P2P network, it will be appreciated by those skilled in the art that the present invention may have utility in substantially any data transfer network in which users are sharing data with unknown parties. The method 200 may be implemented at, for example, a node in a P2P network.

The method 200 is initialized at step 202 and proceeds to step 204, where the method 200 receives a search message, e.g., from a user of the node that is the source of the search message. The search message comprises, for example, one or more search keywords relating to data that a user wishes to search for in the network. For instance, the search message might comprise the words "Joe Smith" and "Happy Birthday" to indicate that the user wishes to search for media files related to Joe Smith's "Happy Birthday" album or song.

In step 206, the method 200 adds at least one "decoy" word to the search message received in step 204. In one embodiment, the decoy word is a natural word that is unrelated to the keywords in the search message. In one embodiment, decoy words are selected arbitrarily from a dictionary for insertion in the search message. In another embodiment, decoy words are fanciful or made up words. For instance, in the example above, the method 200 might add the words "elephant", "giraffe" and "dinosaur" to the search message containing the words "Joe Smith" and "Happy Birthday".

In one embodiment, the number of decoy words that are added to the search message is predefined. For example, a user may specify that a fixed number of decoy words automatically be added to each search message, or that added decoy words comprise a fixed percentage of the total number of words or characters in the original search message. In another embodiment, the number of decoy words added to the search message is based on the lengths of previous search messages sent by the user (e.g., a number of decoy words may be added so that the length of the search message, including the decoy words, substantially matches the average length of previous search messages).

In step 208, the method 200 sends the search message, including the decoy words, e.g., in accordance with typical P2P protocols. The method 200 then receives at least one response message responding to the search message in step 210. In one embodiment, the method 200 may specify that response messages stop being accepted after a specified period of time has elapsed or after a specified number of response messages has been received, in order to prevent response messages from being received indefinitely.

Once the method 200 starts to receive response messages, the method 200 proceeds to step 212 and examines a received response message. Specifically, the method 200 examines the content of the response message. In step 214, the method 200 determines whether the response message contains any of the decoy words that were added to the search message in step 206.

If the response message includes enough decoy words (e.g., as specified by predefined criteria), the method 200 proceeds to step 216 and categorizes the response message as spam. Alternatively, if the response message does not include enough decoy words, the method 200 proceeds to step 218 and categorizes the response message as a legitimate response. In one embodiment, a response message contains "enough" decoy words to be categorized as spam if the response message includes at least a predefined threshold number of decoy words or if decoy words comprise at least a predefined threshold percentage of the total number of words or characters in the response message. In one embodiment, responses that are categorized as spam are discarded.

Those skilled in the art will appreciate that categorizations of response messages as spam or legitimate responses are not absolute. That is, an occasional response message that is identified as spam based on the predefined criteria may in fact be a legitimate response. Likewise, an occasional spam message may not include enough decoy words to be identified as spam based on the predefined criteria. Thus, the predefined criteria may be adjusted by the user to tune the sensitivity of the method 200. Moreover, in one embodiment, the method 200 may present the categorization results (e.g., from steps 216 and 218) to the user as a visual display, where the visual display represents an initial filtering of received response messages by the method 200, and the user may review the initial filtering results in order to verify the proper categorization of the received response messages (e.g., in a manner similar to the filtering of electronic mail by many commercial electronic mail providers). For example, the method 200 may present "spam" and "non-spam" response messages in separate windows or panes on the user's display, or may flag response messages as "spam" or "non-spam" (e.g., using one or more icons).

Once the method 200 has categorized a received response message as either spam or a legitimate response (e.g., in step 216 or 218), the method 200 proceeds to step 220 and determines whether any unexamined response messages remain. If the method 200 determines that there is at least one unexamined response message, the method 200 returns to step 212 and proceeds as described above to examine and categorize the next response message. Alternatively, if the method 200 determines that no unexamined response messages remain, the method 200 terminates in step 222.

The method 200 thereby enables a user on a P2P network to quickly identify spammers within the network. By inserting arbitrary decoy words into a user's search message, the method 200 is able to weed out response messages from nodes that respond to substantially any search message they receive, which is a typical approach that spammers take. Moreover, by identifying spammers prior to downloading data from them, a user can avoid not only downloading spam, but sharing the spam with other users who subsequently download data from the user. In addition, if the user is directly connected to the spammer, the user can choose, based on the information gleaned via application of the method 200, to sever the connection to the spammer, thereby potentially isolating the spammer and preventing him or her from distributing any more spam. Similarly, the user may decide simply to ignore all messages sent from the spammer for a predefined period of time. For example, in one embodiment, the method 200 may add a network identifier (e.g., an IP address) of the spammer to a list of known spammer nodes, where all messages received from nodes on the list are to be ignored for a predefined period of time.

Figure 3:
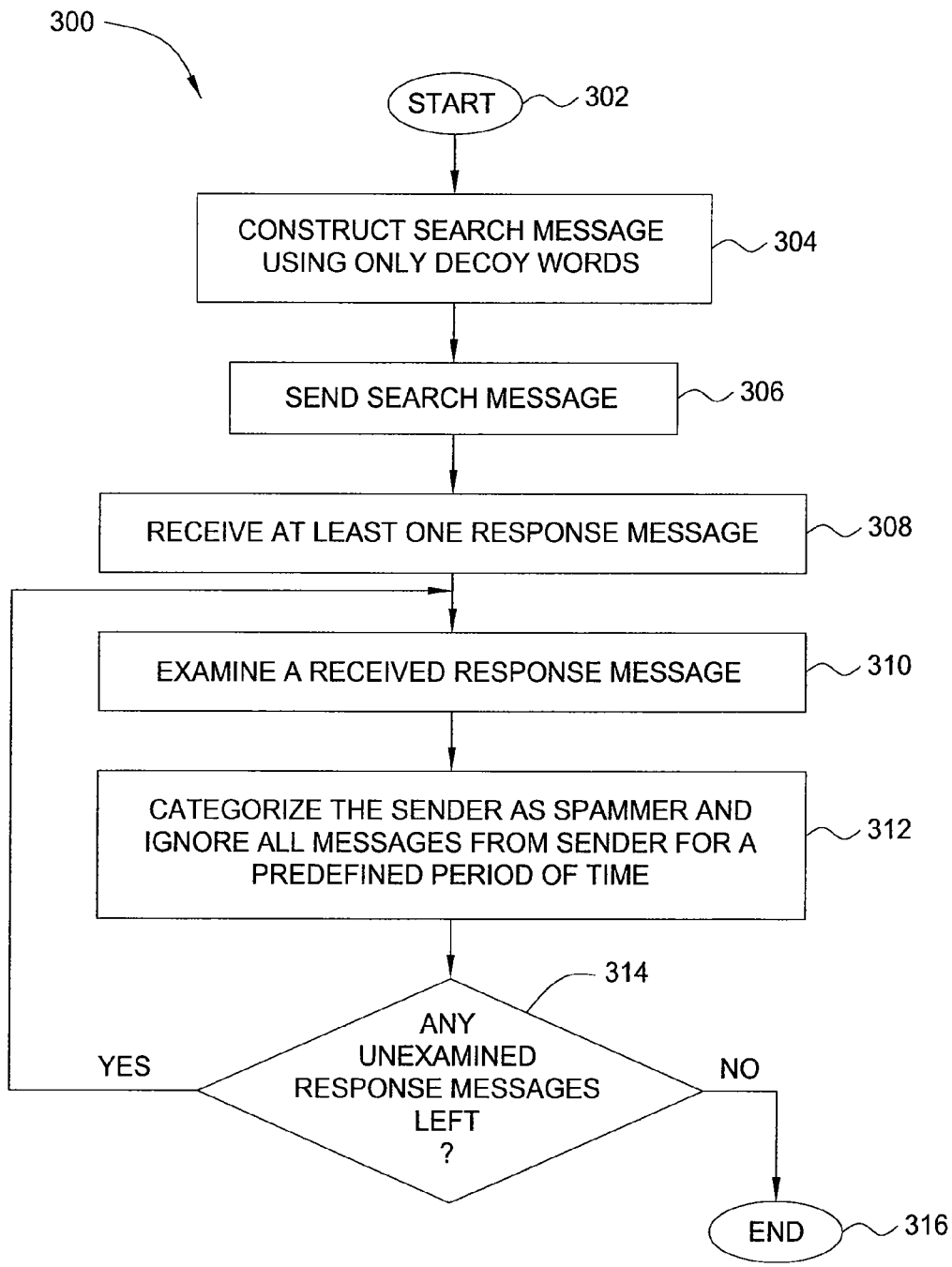
FIG. 3 is a flow diagram illustrating a second embodiment of a method for reducing spam on a P2P network, according to the present invention.

FIG. 3 is a flow diagram illustrating a second embodiment of a method 300 for reducing spam on a P2P network, according to the present invention. Namely, the method 300 is tailored to data transfer networks in which search messages are considered to be the logical AND (e.g., only data matching all keywords in the search message will generate a search response). The method 300 may be implemented at, for example, a node in a P2P network.

The method 300 is initialized at step 302 and proceeds to step 304, where the method 300 constructs a search message using only decoy words. Similar to the decoy words used in the method 200, the decoy words used to construct the search message in step 304 comprise arbitrary, individually unrelated natural words, for example selected from a dictionary. Thus, for example, a search message constructed in step 304 might contain the words "elephant", "orange" and "hockey".

In step 306, the method 300 sends the search message e.g., in accordance with typical P2P protocols. The method 300 then receives at least one response message responding to the search message in step 308. In one embodiment, the method 300 may specify that response messages stop being accepted after a specified period of time has elapsed or after a specified number of response messages has been received, in order to prevent response messages from being received indefinitely.

Once the method 300 starts to receive response messages, the method 300 proceeds to step 310 and examines a received response message. Specifically, the method 300 examines the response message to determine the sender of the response message (e.g., as identified by an IP address associated with the response message).

In step 312, the method 300 categorizes the sender of the response message as a spammer (e.g., a node that is known to send spam). The method 300 may then decide to ignore all messages sent from the sender for a predefined period of time. In one embodiment, the method 300 adds a network identifier (e.g., an IP address) of the sender to a list of known spammer nodes, where all messages received from nodes on the list are to be ignored for a predefined period of time.

Once the method 300 has categorized the sender of the received response message as a spammer, the method 300 proceeds to step 314 and determines whether any unexamined response messages remain. If the method 300 determines that there is at least one unexamined response message, the method 300 returns to step 310 and proceeds as described above to examine and categorize the sender of the next response message. Alternatively, if the method 300 determines that no unexamined response messages remain, the method 300 terminates in step 316.

Figure 4:
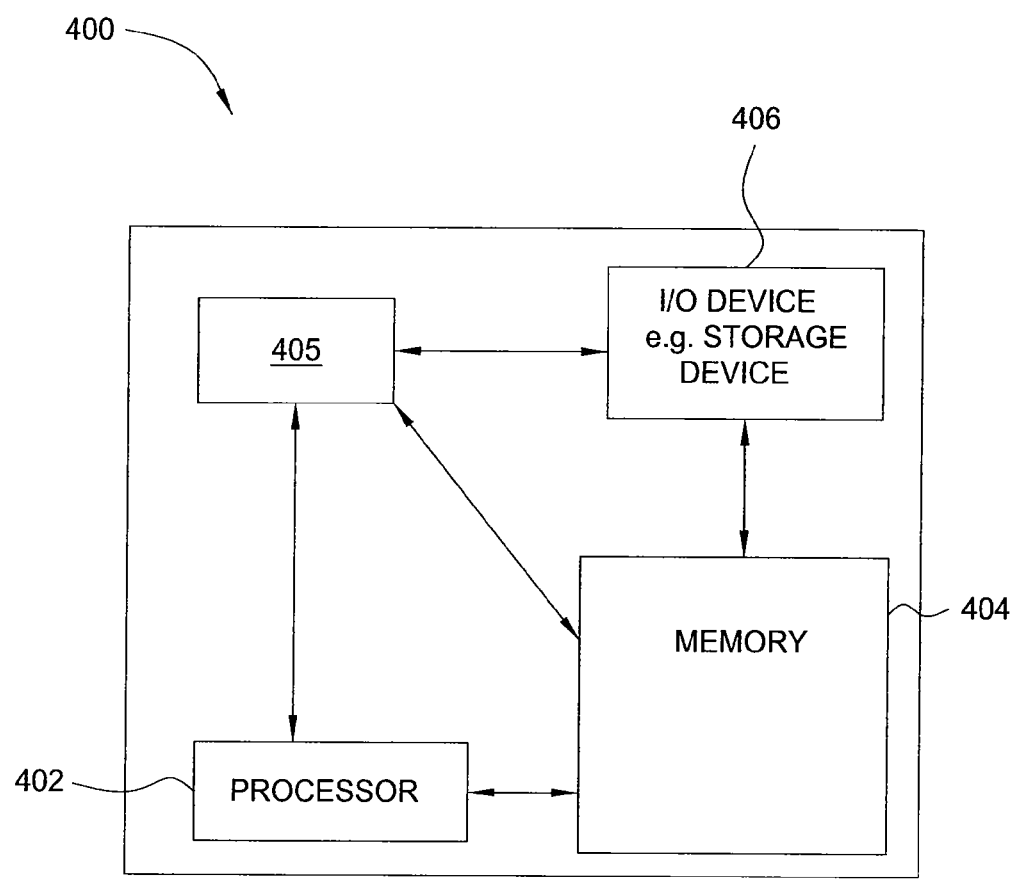
FIG. 4 is a high level block diagram of the spam reduction method that is implemented using a general purpose computing device.

FIG. 4 is a high level block diagram of the spam reduction method that is implemented using a general purpose computing device 400. In one embodiment, a general purpose computing device 400 comprises a processor 402, a memory 404, a spam reduction module 405 and various input/output (I/O) devices 406 such as a display, a keyboard, a mouse, a modem, and the like. In one embodiment, at least one I/O device is a storage device (e.g., a disk drive, an optical disk drive, a floppy disk drive). It should be understood that the spam reduction module 405 can be implemented as a physical device or subsystem that is coupled to a processor through a communication channel.

Alternatively, the spam reduction module 405 can be represented by one or more software applications (or even a combination of software and hardware, e.g., using Application Specific Integrated Circuits (ASIC)), where the software is loaded from a storage medium (e.g., I/O devices 406) and operated by the processor 402 in the memory 404 of the general purpose computing device 400. Thus, in one embodiment, the spam reduction module 405 for reducing spam in a P2P network described herein with reference to the preceding Figures can be stored on a computer readable medium or carrier (e.g., RAM, magnetic or optical drive or diskette, and the like).

Thus, the present invention represents a significant advancement in the field of data transfer networks. A method and apparatus are provided that make it possible for a user to identify disguised spam sent in response to search messages before downloading the associated data, so that the user does not download and subsequently potentially share the spam with other users. Thus, the spreading of spam through a network is substantially reduced.

While foregoing is directed to the preferred embodiment of the present invention, other and further embodiments of the invention may be devised without departing from the basic scope thereof, and the scope thereof is determined by the claims that follow.

The invention claimed is:

1. A method for reducing spam in a network, said method comprising:
   forming, at a first node, a search message, said search message comprising at least one search keyword relating to data for which a user of said first node wishes to search, wherein said first node receives said at least one search keyword directly from said user;
   inserting, by said first node, at least one decoy word that is unrelated to said at least one search keyword into said search message, wherein said at least one decoy word is an arbitrarily selected natural word; and
   sending, by said first node, said search message including said at least one decoy word to one or more nodes in said network, where said one or more nodes are peers of said first node.

2. The method of claim 1, wherein said forming comprises:
   receiving, at said first node, a preliminary search message from said user, said preliminary search message including only said at least one search keyword; and
   adding, by said first node, said at least one decoy word to said preliminary search message to form said search message.

3. The method of claim 2, wherein said adding comprises:
   adding a number of decoy words that comprises a predefined percentage of a total number of words or characters contained in said preliminary search message.

4. The method of claim 1, wherein said adding comprises:
   adding a number of decoy words that comprises a predefined fixed number of decoy words.

5. The method of claim 1, wherein said adding comprises:
   adding a number of decoy words, where said number is based on one or more previous search messages sent by said user.

6. The method of claim 1, further comprising:
   receiving, at said first node, at least one response message in response to said search message; and
   determining, by said first node, whether said at least one response message contains enough of said at least one decoy word to be categorized as spam.

7. The method of claim 6, wherein said at least one response message contains enough decoy words to be categorized as spam if a number of words in said at least one response message that match said at least one decoy word meets or exceeds a predefined threshold number.

8. The method of claim 6, wherein said at least one response message contains enough decoy words to be categorized as spam if at least a predefined threshold percentage of a total number of words or characters in said response message match said at least one decoy word.

9. The method of claim 6, further comprising:
   identifying, by said first node and to said user, those of said at least one response message that are categorized as spam messages and those of said at least one response message that are categorized as legitimate responses.

10. The method of claim 9, wherein said identifying is made by presenting said spam messages and said legitimate responses in separate windows on a display.

11. The method of claim 9, wherein said identifying is made by flagging said spam messages and said legitimate responses with different icons.

12. The method of claim 6, wherein said at least one response message is discarded if said at least one response message is categorized as spam.

13. The method of claim 1, wherein said forming comprises:
   constructing, by said first node, said search message from only said at least one decoy word.

14. The method of claim 1, further comprising:
   receiving, at said first node, at least one response message in response to said search message; and
   categorizing, by said first node, a sender of said at least one response message as a spammer.

15. The method of claim 14, wherein said categorizing comprises:
   adding, by said first node, said sender to a list of known spammers.

16. The method of claim 14, wherein said categorizing comprises:
   ignoring, by said first node, one or more subsequent messages sent by said sender for a predefined period of time.

17. The method of claim 1, wherein said inserting is performed before said search message is sent into said network.

18. A computer readable medium containing an executable program for reducing spam in a network, where the program performs steps of:
  forming, at a first node, a search message, said search message comprising at least one search keyword relating to data for which a user of said first node wishes to search, wherein said first node receives said at least one search keyword directly from said user;
  inserting, by said first node, at least one decoy word that is unrelated to said at least one search keyword into said search message, wherein said at least one decoy word is an arbitrarily selected natural word; and
  sending, by said first node, said search message including said at least one decoy word to one or more nodes in said network, where said one or more nodes are peers of said first node.

19. The computer readable medium of claim 18, wherein said forming comprises:
  receiving, at said first node, a preliminary search message from said user, said preliminary search message including only said at least one search keyword; and
  adding, by said first node, said at least one decoy word to said preliminary search message to form said search message.

20. The computer readable medium of claim 19, wherein said adding comprises:
  adding a number of decoy words that comprises a predefined percentage of a total number of words or characters contained in said preliminary search message.

21. The computer readable medium of claim 18, wherein said adding comprises:
  adding a number of decoy words that comprises a predefined fixed number of decoy words.

22. The computer readable medium of claim 18, wherein said adding comprises:
  adding a number of decoy words, where said number is based on one or more previous search messages sent by said user.

23. The computer readable medium of claim 18, further comprising:
  receiving, at said first node, at least one response message in response to said search message; and
  determining, by said first node, whether said at least one response message contains enough of said at least one decoy word to be categorized as spam.

24. The computer readable medium of claim 23, wherein said at least one response message contains enough decoy words to be categorized as spam if a number of words in said at least one response message that match said at least one decoy word meets or exceeds a predefined threshold number.

25. The computer readable medium of claim 23, wherein said at least one response message contains enough decoy words to be categorized as spam if at least a predefined threshold percentage of a total number of words or characters in said response message match said at least one decoy word.

26. The computer readable medium of claim 23, further comprising:
  identifying, by said first node and to said user, those of said at least one response message that are categorized as spam messages and those of said at least one response message that are categorized as legitimate responses.

27. The computer readable medium of claim 18, wherein said forming comprises:
  constructing, by said first node, said search message from only said at least one decoy word.

28. The computer readable medium of claim 18, further comprising:
  receiving, at said first node, at least one response message in response to said search message; and
  categorizing, by said first node, a sender of said at least one response message as a spammer.

29. The computer readable medium of claim 28, wherein said categorizing comprises:
  adding, by said first node, said sender to a list of known spammers.

30. The computer readable medium of claim 18, wherein said inserting is performed before said search message is sent into said network.

31. Apparatus for reducing spam in a network, said apparatus comprising:
  means forming, at a first node, a search message, said search message comprising at least one search keyword relating to data for which a user of said first node wishes to search, wherein said first node receives said at least one search keyword directly from said user;
  means for inserting, by said first node, at least one decoy word that is unrelated to said at least one search keyword into said search message, wherein said at least one decoy word is an arbitrarily selected natural word; and
  means for sending, by said first node, said search message including said at least one decoy word to one or more nodes in said network, where said one or more nodes are peers of said first node.

* * * * *